United States Patent
Cheng et al.

(10) Patent No.: US 9,967,549 B2
(45) Date of Patent: May 8, 2018

(54) 3D IMAGE CAPTURE METHOD WITH 3D PREVIEW OF PREVIEW IMAGES GENERATED BY MONOCULAR CAMERA AND RELATED ELECTRONIC DEVICE THEREOF

(71) Applicant: MEDIATEK INC., Hsin-Chu (TW)

(72) Inventors: Chia-Ming Cheng, Hsinchu (TW); Cheng-Che Chan, Hsinchu County (TW); Po-Hao Huang, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 452 days.

(21) Appl. No.: 14/173,826

(22) Filed: Feb. 6, 2014

(65) Prior Publication Data

US 2014/0285637 A1  Sep. 25, 2014

Related U.S. Application Data

(60) Provisional application No. 61/803,517, filed on Mar. 20, 2013.

(51) Int. Cl.
*G06T 1/00* (2006.01)
*H04N 13/02* (2006.01)
*H04N 13/04* (2006.01)

(52) U.S. Cl.
CPC ..... *H04N 13/0296* (2013.01); *H04N 13/0221* (2013.01); *H04N 13/04* (2013.01)

(58) Field of Classification Search
CPC . H04N 13/0296; H04N 13/0221; H04N 13/04
See application file for complete search history.

(56) References Cited

U.S. PATENT DOCUMENTS

| | | | | |
|---|---|---|---|---|
| 6,084,590 A | * | 7/2000 | Robotham | G06T 13/00 345/419 |
| 6,570,578 B1 | * | 5/2003 | Smirnov | G06T 15/50 345/473 |
| 6,665,003 B1 | * | 12/2003 | Peleg | 348/36 |
| 8,330,801 B2 | * | 12/2012 | Wang | G06K 9/20 345/419 |
| 2001/0043219 A1 | * | 11/2001 | Robotham | G06T 13/00 345/474 |
| 2004/0041906 A1 | * | 3/2004 | Fruit | H04N 13/021 348/50 |

(Continued)

FOREIGN PATENT DOCUMENTS

| | | |
|---|---|---|
| CN | 102917236 A | 2/2013 |
| TW | 201304511 A1 | 1/2013 |

*Primary Examiner* — Sath V Perungavoor
*Assistant Examiner* — Philip Dang
(74) *Attorney, Agent, or Firm* — Winston Hsu

(57) ABSTRACT

A three-dimensional (3D) image capture method, employed in an electronic device with a monocular camera and a 3D display, includes at least the following steps: while the electronic device is moving, deriving a 3D preview image from a first preview image and a second preview image generated by the monocular camera, and providing 3D preview on the 3D display according to the 3D preview image, wherein at least one of the first preview image and the second preview image is generated while the electronic device is moving; and when a capture event is triggered, outputting the 3D preview image as a 3D captured image.

14 Claims, 10 Drawing Sheets

(56) References Cited

U.S. PATENT DOCUMENTS

| | | |
|---|---|---|
| 2004/0046885 A1 | 3/2004 | Regan |
| 2010/0097375 A1* | 4/2010 | Tadaishi ................. G06T 17/00 345/420 |
| 2010/0188483 A1 | 7/2010 | Berger |
| 2011/0001805 A1 | 1/2011 | Mentz |
| 2011/0102548 A1 | 5/2011 | Kim |
| 2011/0102553 A1* | 5/2011 | Corcoran ........... G06K 9/00281 348/50 |
| 2011/0213664 A1* | 9/2011 | Osterhout ............ G02B 27/017 705/14.58 |
| 2012/0169850 A1 | 7/2012 | Kim |
| 2012/0229609 A1* | 9/2012 | Yamada ............. H04N 13/0264 348/46 |
| 2012/0257016 A1* | 10/2012 | Nakajima ................ G06T 17/20 348/46 |
| 2013/0009951 A1* | 1/2013 | Kwon ................. H04N 13/026 345/419 |

* cited by examiner

3D IMAGE CAPTURE METHOD WITH 3D PREVIEW OF PREVIEW IMAGES GENERATED BY MONOCULAR CAMERA AND RELATED ELECTRONIC DEVICE THEREOF

CROSS REFERENCE TO RELATED APPLICATIONS

This application claims the benefit of U.S. provisional application No. 61/803,517, filed on Mar. 20, 2013 and incorporated herein by reference.

BACKGROUND

The disclosed embodiments of the present invention relate to capturing images, and more particularly, to a three-dimensional (3D) capture method with 3D preview (function) of preview images generated by a monocular camera (i.e., a single monocular camera) and related electronic device thereof.

With the development of science and technology, users are pursing stereoscopic and more real image displays rather than high quality images. The main theory of a 3D image playback is to make the left eye and the right eye see different images, thus the brain will regard the different images seen from two eyes as a 3D image.

During a 3D image acquiring process, the user cannot have 3D preview (function) of the 3D image before the 3D image is generated. That is, the 3D image capture result has to be checked after two 2D images are generated and merged. Hence, in a case where the electronic device is also equipped with a 3D display, each of the two 2D images is generated under a 2D preview mode, and the captured 3D image is only displayed on the 3D display in a playback mode. The user experience of using the electronic device to capture a 3D image is poor. Besides, the captured 3D image may violate the stereoscopic vision, which causes the visual fatigue when the captured 3D image is displayed.

SUMMARY

In accordance with exemplary embodiments of the present invention, a three-dimensional (3D) capture method with 3D preview of preview images generated by a monocular camera and related electronic device thereof are proposed to solve the above-mentioned problem.

According to a first aspect of the present invention, an exemplary three-dimensional (3D) image capture method employed in an electronic device with a monocular camera and a 3D display is disclosed. The exemplary 3D image capture method includes at least the following steps: while the electronic device is moving, deriving a 3D preview image from a first preview image and a second preview image generated by the monocular camera, and providing 3D preview on the 3D display according to the 3D preview image, wherein at least one of the first preview image and the second preview image is generated while the electronic device is moving; and when a capture event is triggered, outputting the 3D preview image as a 3D captured image.

According to a second aspect of the present invention, an exemplary electronic device with a three-dimensional (3D) image capture function is disclosed. The exemplary electronic device includes a monocular camera, a 3D display, and a controller. While the electronic device is moving, the controller derives a 3D preview image from a first preview image and a second preview image generated by the monocular camera, and controls the 3D display to provide 3D preview according to the 3D preview image, wherein at least one of the first preview image and the second preview image is generated while the electronic device is moving. When a capture event is triggered, the controller outputs the 3D preview image as a 3D captured image.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The main concept of the present invention is to provide 3D preview (i.e., a 3D preview function) for a user before a captured 3D image is output, thus achieving what you see is what you get. As the user can perceive the 3D preview during the 3D image capture process, the user experience of using an electronic device to capture the 3D image is enhanced. Besides, the present invention further proposes performing an image rectification to make the captured 3D image satisfy a stereoscopic vision requirement, thus avoiding/mitigating the visual fatigue when the captured 3D image is displayed. Further details of the proposed 3D image capture scheme are described as below.

Figure 1:
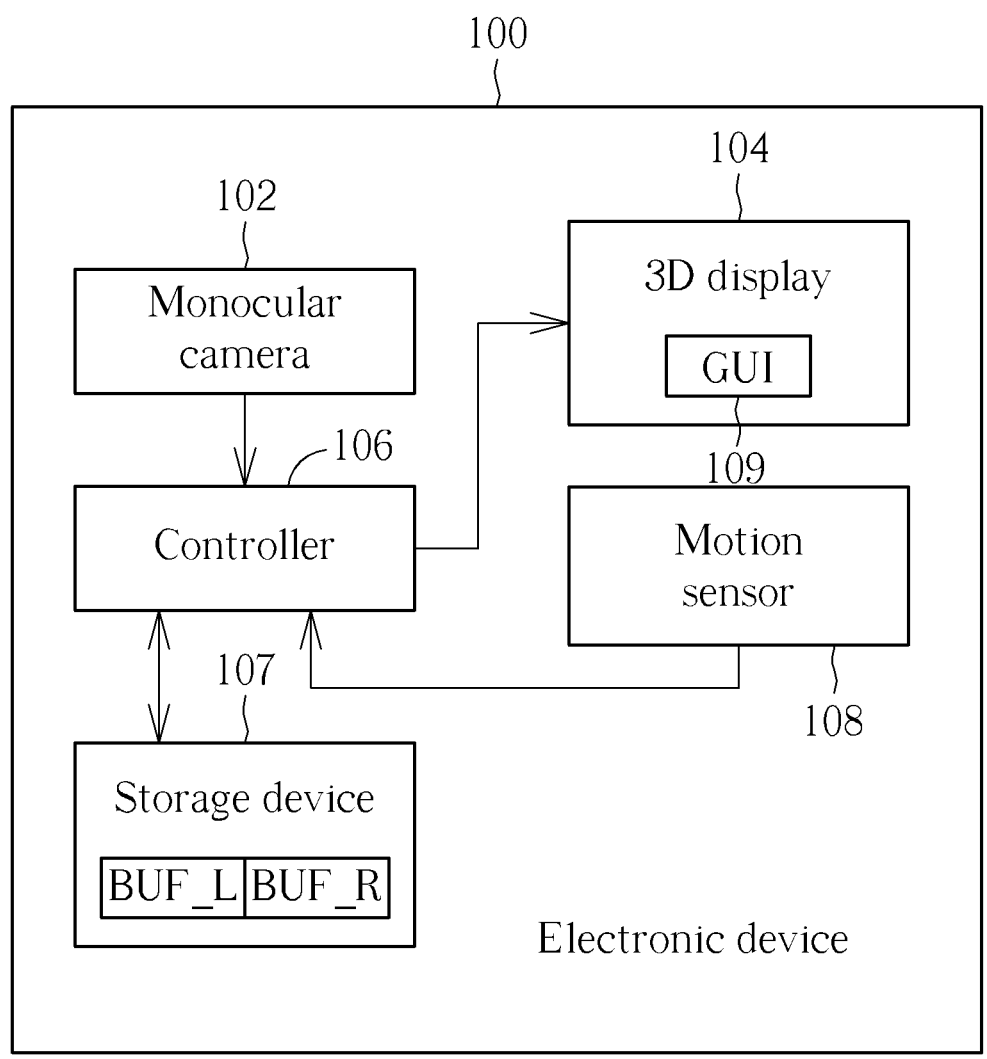
FIG. 1 is a block diagram illustrating an electronic device with a 3D image capture function according to an embodiment of the present invention.

FIG. 1 is a block diagram illustrating an electronic device with a 3D image capture function according to an embodiment of the present invention. The electronic device 100 may be a portable device such as a cellular phone or a tablet. In this embodiment, the electronic device 100 includes a monocular camera 102, a 3D display 104, a controller 106, a storage device 107, and an optional motion sensor 108. The monocular camera 102 is used to generate one left-view preview image and one right-view preview image at different time points. The captured left-view preview image and the captured right-view preview image are stored into a left-view buffer BUF_L and a right-view buffer BUF_R allocated in the storage device 107, respectively. When the electronic device 100 is operated under a 3D preview mode, the controller 107 controls the 3D display 104 to show 3D preview (i.e. to provide a 3D preview function) based on the captured left-view preview image and the captured right-view preview image stored in the storage device 107. For example, a graphical user interface (GUI) 109 may be displayed on the 3D display 104 for receiving the user input and showing the 3D preview (i.e. providing 3D preview function). In this embodiment, the electronic device 100 is equipped with only one monocular camera 102, and the monocular camera 102 is capable of capturing a single two-dimensional (2D) image only. Hence, to obtain a 3D image, the GUI 109 may show a message to guide the user to move the electronic device 100 such that the monocular camera 102 is capable of capturing another 2D image at a different position. In a case where the electronic device 100 is equipped with the motion sensor 108, the motion sensor 108 can provide motion information associated with the electronic device 100 (i.e., motion information associated with the monocular camera 102) to the controller 106 to facilitate the 3D image capture procedure.

Figure 2:
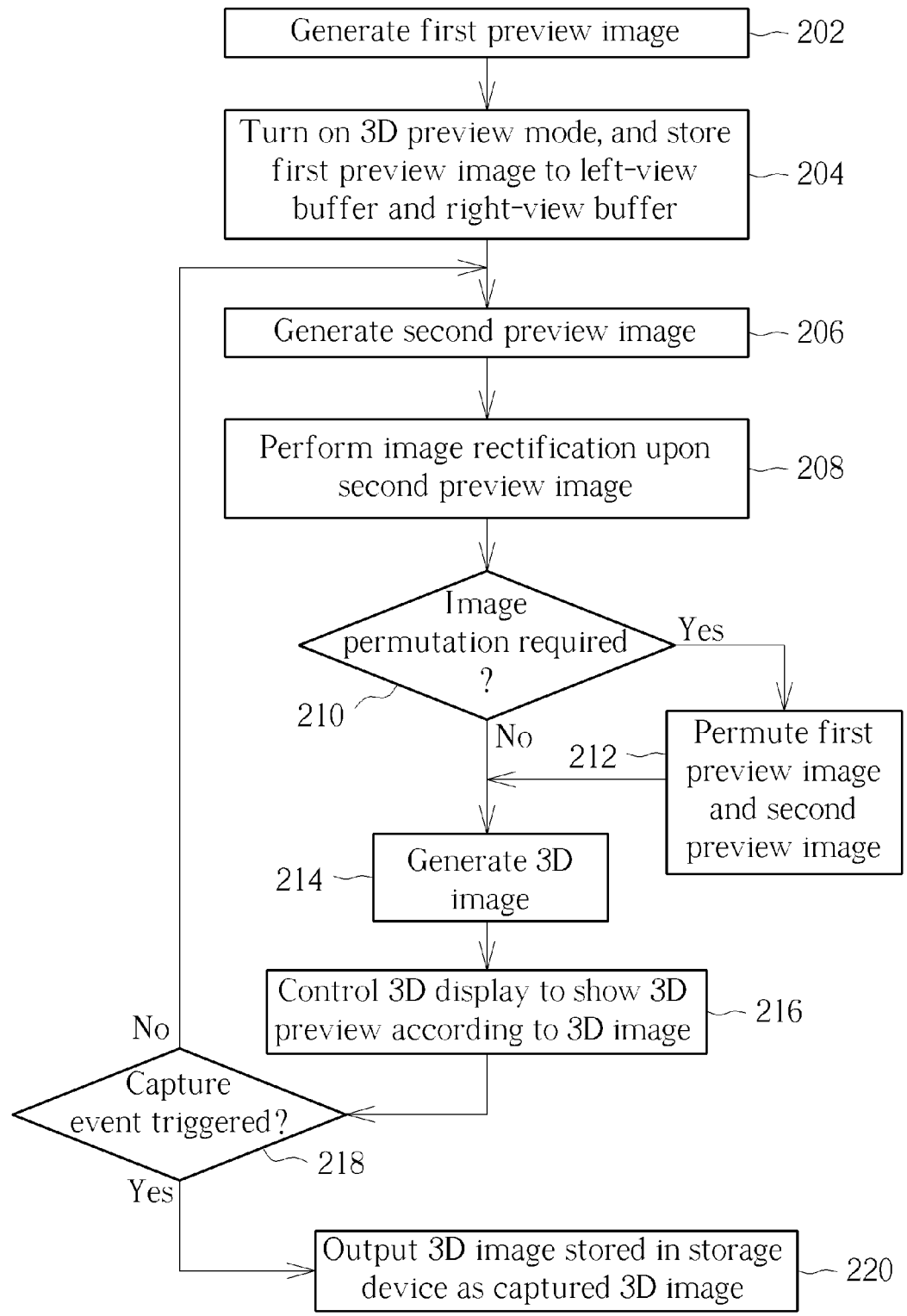
FIG. 2 is a flowchart illustrating a first 3D image capture method according to an embodiment of the present invention.
Figure 3:
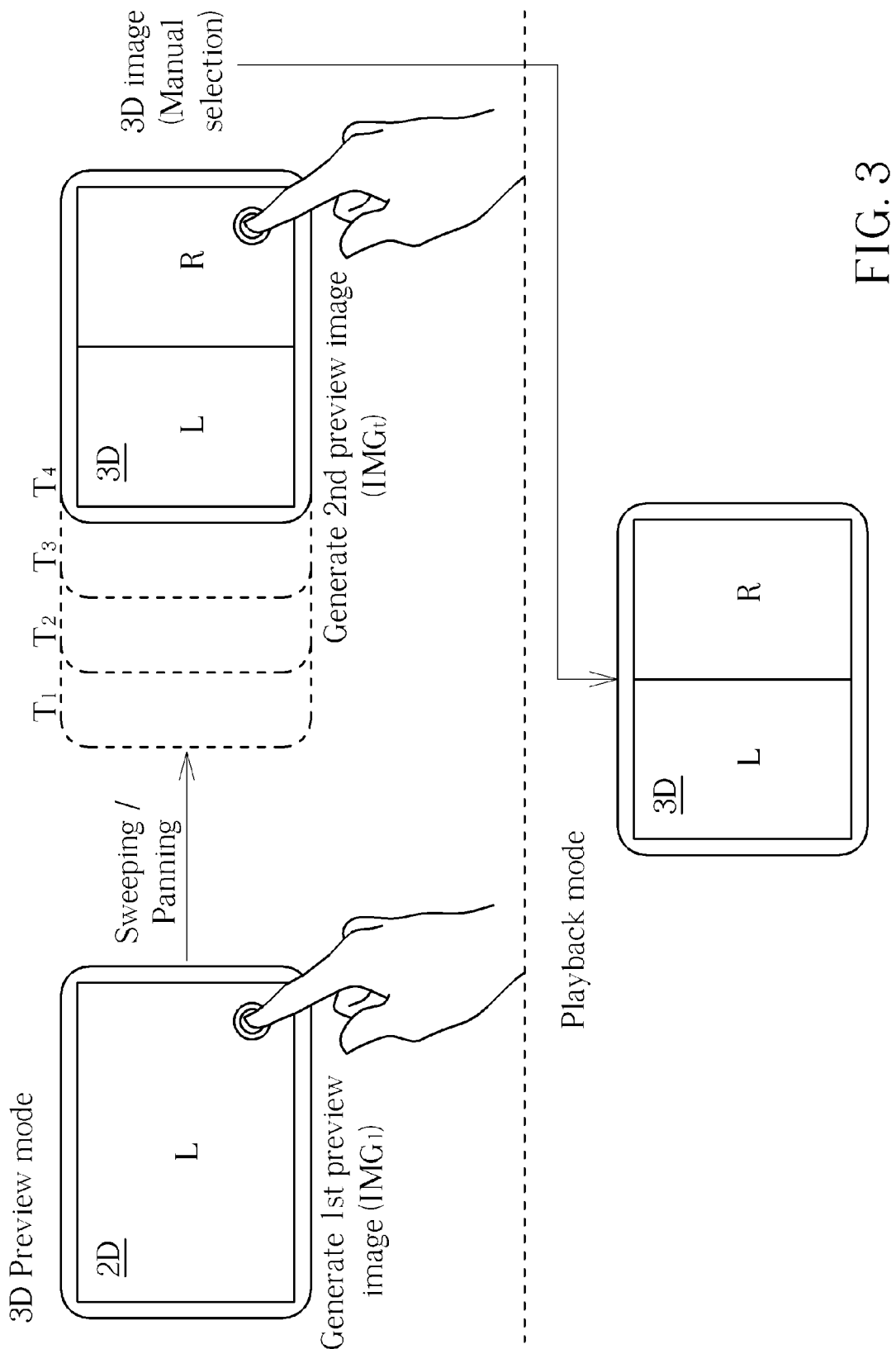
FIG. 3 is a diagram illustrating a first operational scenario of the 3D image capture function performed by the electronic device shown in FIG. 1.

Please refer to FIG. 2 in conjunction with FIG. 3. FIG. 2 is a flowchart illustrating a first 3D image capture method according to an embodiment of the present invention. FIG. 3 is a diagram illustrating a first operational scenario of the 3D image capture method performed by the electronic device 100 shown in FIG. 1. When the election device 100 is still, the user touches the 3D display 104 with touch control capability to enter a user input. In step 202, a first preview image $IMG_1$ determined/generated from the monocular camera 102 is received by the controller 106. Next, in step 204, the controller 106 turns on a 3D preview mode, and stores the first preview image $IMG_1$ into each of the left-view image buffer BUF_L and the right-view image buffer BUF_R allocated in the storage device 107. The GUI 109 may instruct the user to start moving the election device 100. While the election device 100 is moving, the monocular camera 102 automatically determines/generates one second preview image $IMG_t$ without user intervention (step 206). As shown in FIG. 3, the first preview image $IMG_1$ is fixed while the electronic device 100 is moving. In other words, in this embodiment, the first preview image $IMG_1$ captured by the monocular camera 102 would directly act as one of the left-view image and the right-view image of a generated 3D image.

In step 208, the controller 106 performs an image rectification upon the second preview image $IMG_t$ to make a 3D image derived from the first preview image $IMG_1$ and the second preview image $IMG_t$ to satisfy a stereoscopic vision requirement. By way of example, but not limitation, self-rectification with single-image warping may be employed to adjust the stereo geometry.

Figure 4:
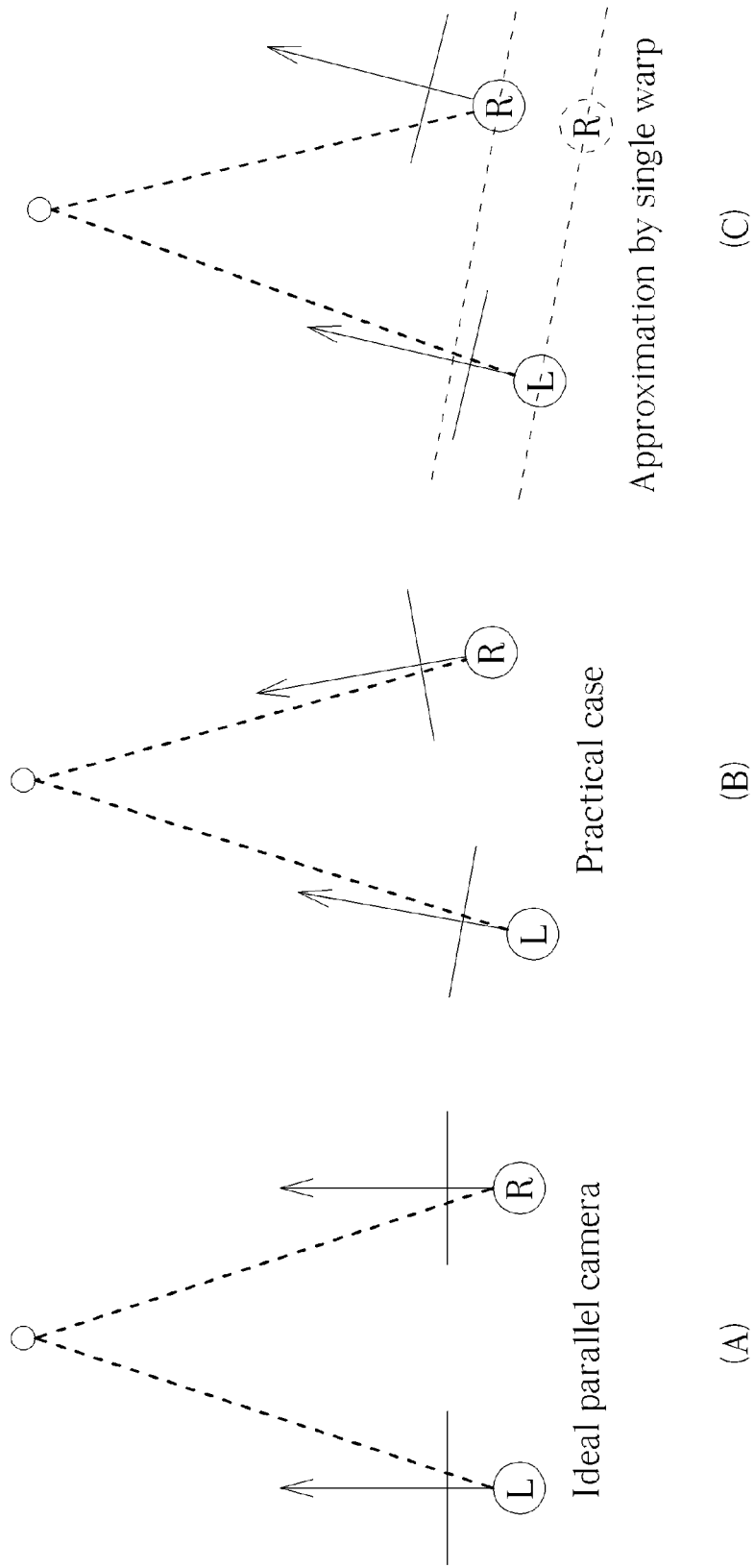
FIG. 4 is a diagram illustrating the operation of the self-rectification with single-image warping according to an embodiment of the present invention.

Please refer to FIG. 4, which is a diagram illustrating the operation of the self-rectification with single-image warping according to an embodiment of the present invention. Suppose that the first preview image $IMG_1$ is a left-view image. Ideally, the user horizontally moves the electronic device 100 such that the second preview image $IMG_t$ (which is a right-view image) and the first preview image $IMG_1$ (which is a left-view image), each generated by the monocular camera 102, may be regarded as two images generated by an ideal parallel camera, as illustrated by sub-diagram (A) of FIG. 4. However, the user may rotate the electronic device 100 while moving the electronic device 100. As a result, compared to the first preview image $IMG_1$, the second preview image $IMG_t$ may have geometry deformation, as illustrated by sub-diagram (B) of FIG. 4. This results in a 3D image which may violate the stereoscopic vision. Hence, the image rectification procedure is employed to adjust/warp the second preview image $IMG_t$ to make the geometry of the second preview image $IMG_t$ match that of the first preview image $IMG_1$. Specifically, the proposed self-rectification with single-image warping scheme warps the second preview image $IMG_t$ with the first preview image $IMG_1$ kept unchanged, as illustrated by sub-diagram (C) of FIG. 4. Hence, the continuous change in the second preview image $IMG_t$ can be constrained by the first preview image $IMG_1$ acting as a reference image. In the end, a best solution can be found to make the generated 3D image derived from the first preview image $IMG_1$ (originally generated from the monocular camera 102) and the second preview image $IMG_t$ (adjusted/warped by the image rectification) satisfy the stereoscopic vision requirement. To put it another way, the image rectification is equivalent to a real-time online stereo camera calibration.

It should be noted that, when the electronic device 100 is equipped with the motion sensor 108, the motion information provided by the motion sensor 108 can be referenced by the image rectification performed by the controller 106. That is, the additional motion information can be used to facilitate the single-image self-rectification computation.

Figure 5:
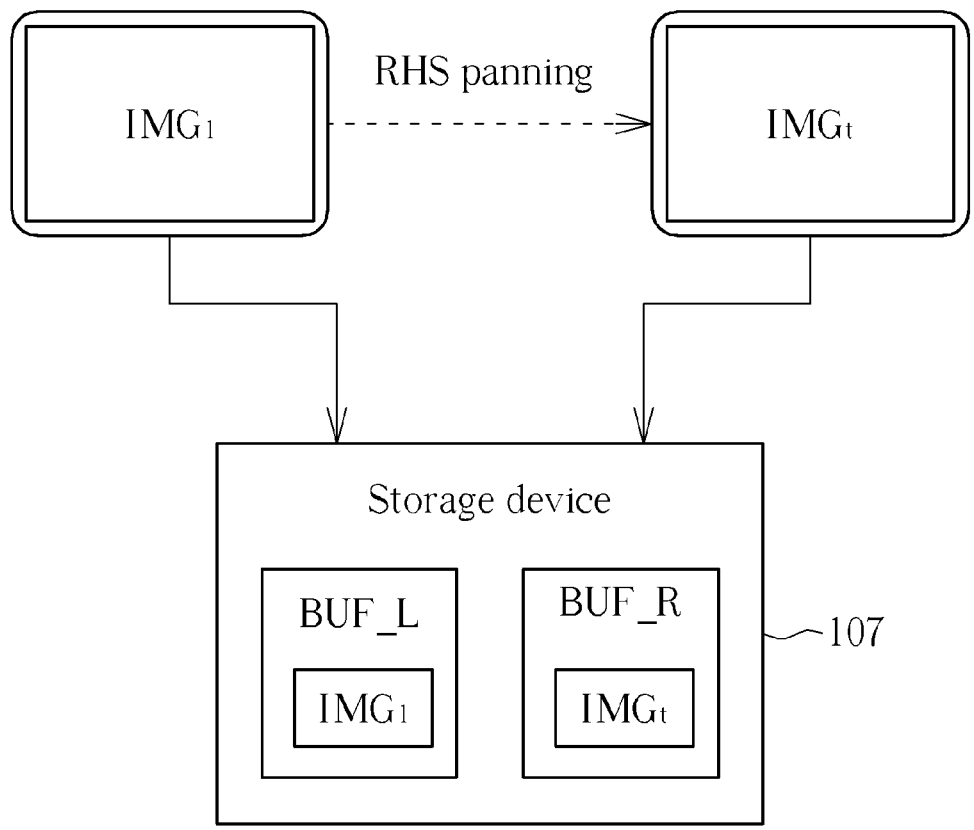
FIG. 5 is a diagram illustrating a first case where the electronic device has right-hand size (RHS) panning.
Figure 6:
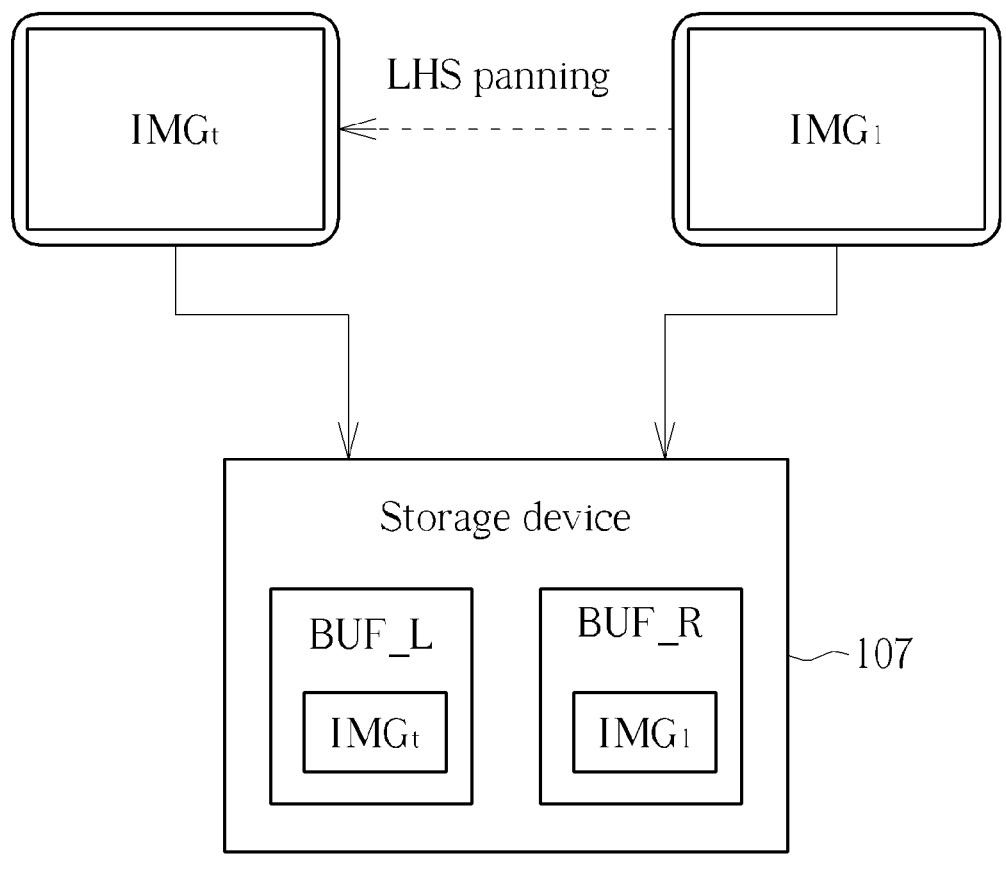
FIG. 6 is a diagram illustrating a second case where the electronic device has left-hand size (LHS) panning.

In step 210, the controller 106 checks if image permutation is required. Please refer to FIG. 5 and FIG. 6. FIG. 5 is a diagram illustrating a first case where the electronic device 100 has right-hand size (RHS) panning. FIG. 6 is a diagram illustrating a second case where the electronic device 100 has left-hand size (LHS) panning. When the electronic device 100 has RHS panning, the first preview image $IMG_1$ is a left-view image, and the second preview image $IMG_t$ is a right-view image. Suppose that the controller 106 initially treats the first preview image $IMG_1$ as a left-view image. Hence, the controller 106 will store the first preview image $IMG_1$ and the second preview image $IMG_t$ into the left-view buffer BUF_L and the right-view buffer BUF_R, respectively. No image permutation is required. However, when the electronic device 100 has LHS panning, the first preview image $IMG_1$ is a right-view image, and the second preview image $IMG_t$ is a left-view image. Suppose that the controller 106 initially treats the first preview image $IMG_1$ as a left-view image. Hence, the image permutation is required to ensure that the first preview image $IMG_1$ is correctly stored in the left-view buffer BUF_L and the second preview image $IMG_t$ is correctly stored in the right-view buffer BUF_R.

In one exemplary design, the controller 106 analyzes the first preview image $IMG_1$ and the second preview image $IMG_t$ to detect the hand-held motion, and then automatically determines whether the first preview image $IMG_1$ is a left-view image or a right-view image. In another exemplary design where the electronic device 100 is equipped with the motion sensor 108, the motion information provided by the motion sensor 108 can be referenced by the image permutation performed by the controller 106.

When it is determined that the image permutation is required, the controller 106 permutes the first preview image $IMG_1$ and the second preview image $IMG_t$ to make the left-view buffer BUF_L and the right-view buffer BUF_L have correct images stored therein (steps 212, 214). When it is determined that no image permutation is required, the first preview image $IMG_1$ and the second preview image $IMG_t$ are correctly stored in the left-view buffer BUF_L and the right-view buffer BUF_L (step 214). In this way, a 3D image $IMG_{3D}$ derived from the first preview image $IMG_1$ and the second preview image $IMG_t$ are generated and stored in the storage device 107.

Next, the controller 106 controls the 3D display 104 to show 3D preview (i.e. to provide a 3D preview function) according to the 3D image $IMG_{3D}$ stored in the storage device 107 (step 216). Hence, the user can perceive the actual 3D effect of the 3D image $IMG_{3D}$ during the 3D image capture procedure. In this embodiment, based on a 3D preview result, the user can manually determine if the current 3D image $IMG_{3D}$ should be outputted as a captured 3D image. For example, when the user wants the current 3D image $IMG_{3D}$ to be a captured 3D image, the user may touch the 3D display 104 with touch control capability to enter a user input to trigger a capture event. Hence, the captured 3D image derived from the first preview image $IMG_1$ and the second preview image $IMG_t$ is outputted (steps 218, 220).

However, if the user does not want the current 3D image $IMG_{3D}$ to be selected as a captured 3D image, the user keeps moving the electronic device 100 without triggering a capture even. Hence, the flow proceeds with step 206 to generate a new preview image by using the monocular camera 122, where the second preview image $IMG_t$ is updated by the new preview image. In other words, before the capture event is triggered by the user, the second preview image $IMG_t$ will be continuously updated while the electronic device 100 is moving. As shown in FIG. 3, when the electronic device 100 is moved to a first position at time $T_1$, one second preview image $IMG_t$ is generated. If the user does not like the 3D effect presented by the 3D image derived from the fixed first preview image IMG1 and the current second preview image $IMG_t$, the monocular camera 102 generates one updated second preview image $IMG_t$ when the electronic device 100 is moved to a second position at time $T_2$. If the user still does not like the 3D effect presented by the 3D image derived from the fixed first preview image IMG1 and the current second preview image $IMG_t$, the monocular camera 102 generates one updated second preview image $IMG_t$ when the electronic device 100 is moved to a third position at time $T_3$. Similarly, If the user still does not like the 3D effect presented by the 3D image derived from the fixed first preview image IMG1 and the current second preview image $IMG_t$, the monocular camera 102 generates one updated second preview image $IMG_t$ when the electronic device 100 is moved to a fourth position at time $T_4$. At time $T_4$, the user is now satisfied with the 3D effect presented by the 3D image derived from the fixed first preview image IMG1 and the current second preview image $IMG_t$. Thus, the user triggers a capture event through manual selection. In this way, the 3D image stored in the storage device 107 is outputted as a captured 3D image which can be displayed when the electronic device 100 is operated under a playback mode later.

In the above embodiment, the capture event is triggered by the user manually. For example, the user may touch the 3D display with touch control capability. Alternative, the user may trigger the capture event without having a physical contact with the electronic device 100. For example, the electronic device 100 is configured to support a voice control function. Hence, the user can trigger the capture event by inputting a voice command.

Figure 7:
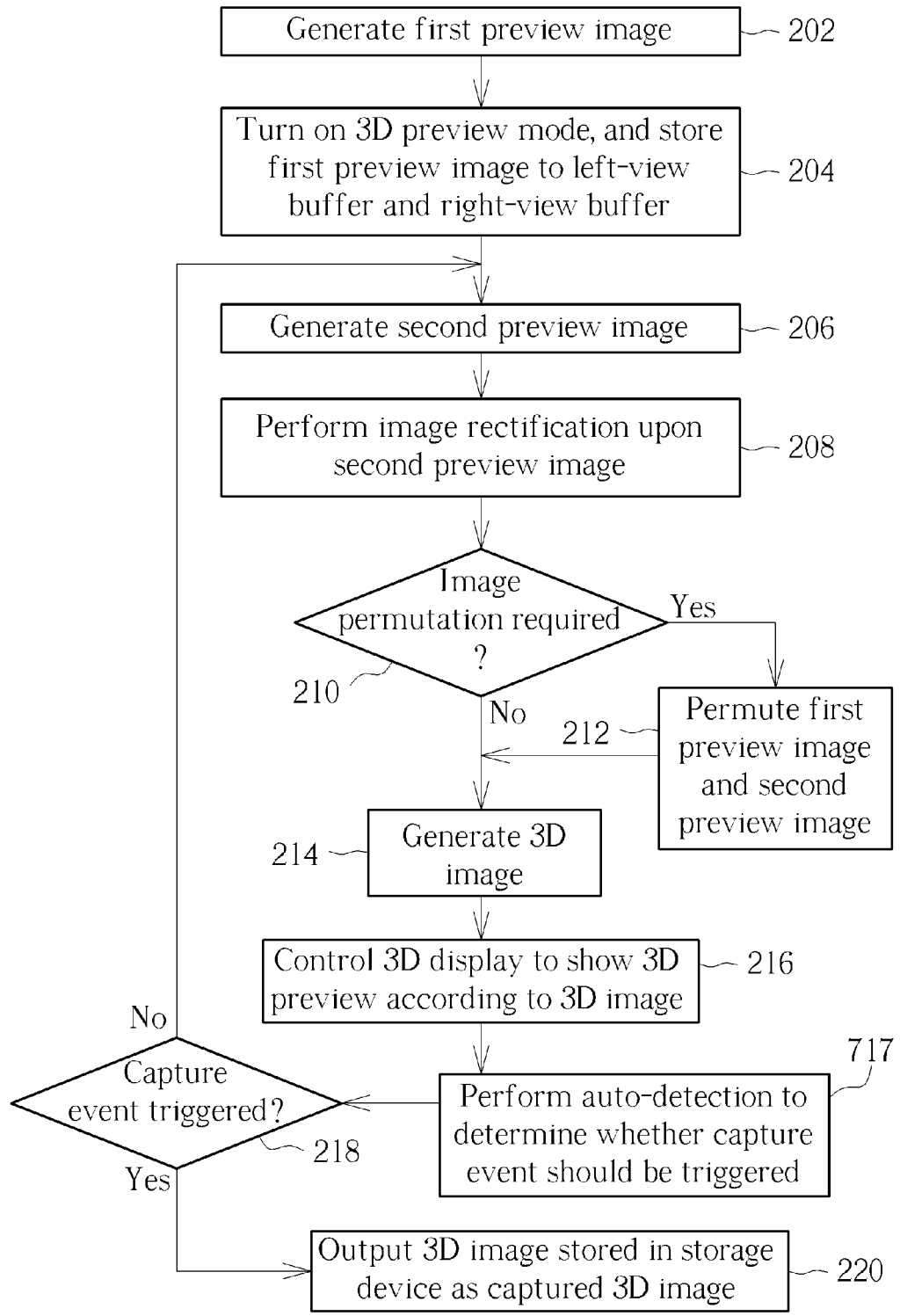
FIG. 7 is a flowchart illustrating a second 3D image capture method according to an embodiment of the present invention.
Figure 8:
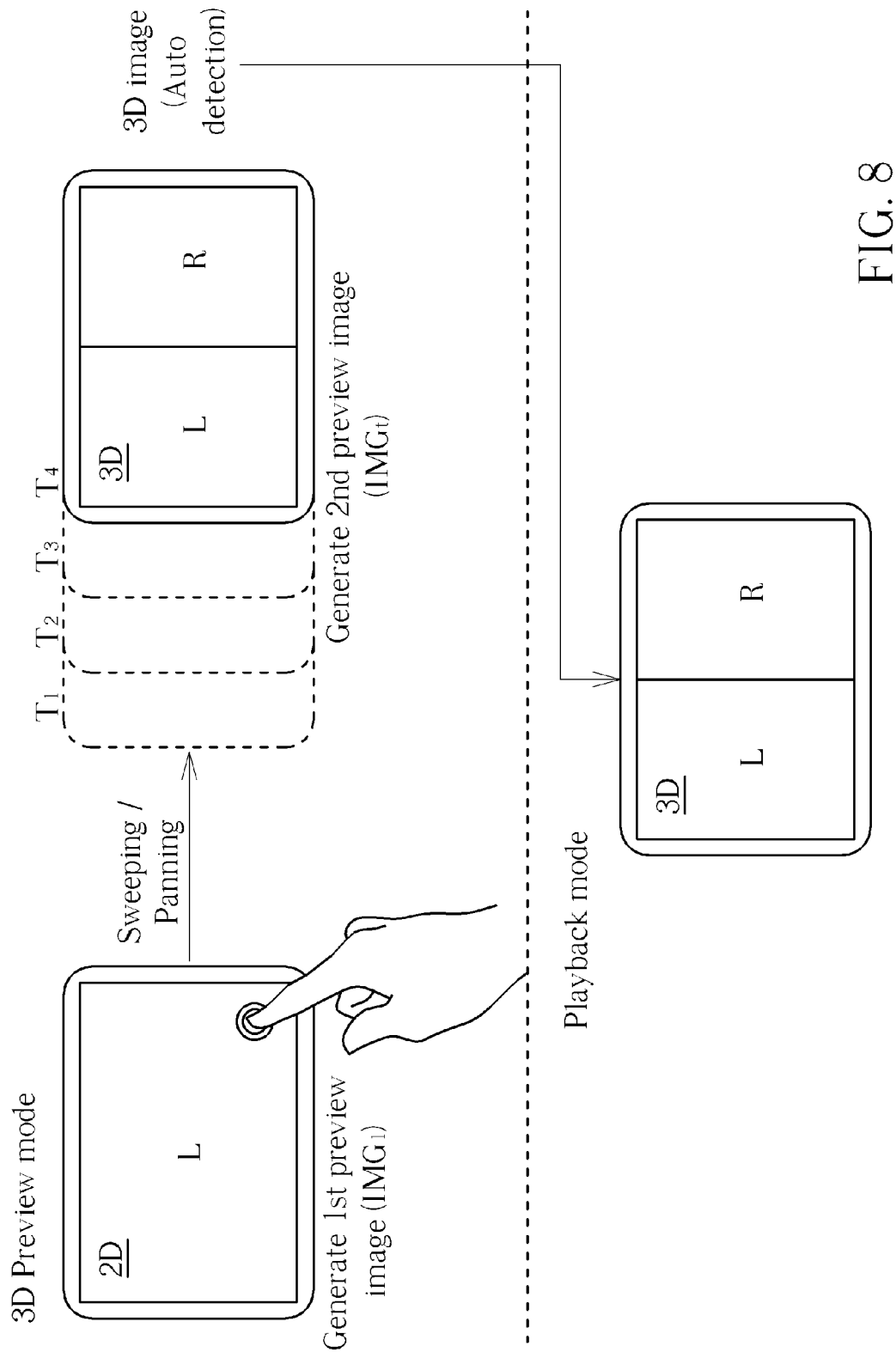
FIG. 8 is a diagram illustrating a second operational scenario of the 3D image capture function performed by the electronic device shown in FIG. 1.

In another embodiment, the capture event may be automatically triggered without user intervention. For example, an auto-detection procedure may be employed by the controller 106 to check if a 3D quality requirement is satisfied. Please refer to FIG. 7 in conjunction with FIG. 8. FIG. 7 is a flowchart illustrating a second 3D image capture method according to an embodiment of the present invention. FIG. 8 is a diagram illustrating a second operational scenario of the 3D image capture function performed by the electronic device 100 shown in FIG. 1. The major difference between the 3D image capture methods shown in FIG. 2 and FIG. 7 is the step 717 inserted between steps 216 and 218. In step 717, the controller 106 performs an auto-detection procedure to determine whether the capture event should be triggered. More specifically, the controller 106 automatically checks the 3D quality of the 3D image derived from the fixed first preview image $IMG_1$ and the current second preview image $IMG_t$. For example, the 3D quality requirement may include one or more criteria of quality-related factors, including geometry, color, clarity, etc. When the 3D quality of the 3D image derived from the fixed first preview image $IMG_1$ and the current second preview image $IMG_t$ satisfies the 3D quality requirement, the auto-detection procedure triggers a capture event automatically. Hence, the 3D image stored in the storage device 107 is automatically outputted as a captured 3D image which can be displayed when the electronic device 100 is operated under the playback mode later (steps 218, 220). However, when the 3D quality of the 3D image derived from the fixed first preview image $IMG_1$ and the current second preview image $IMG_t$ does not satisfy the 3D quality requirement, the flow proceeds with step 206 to generate a new preview image to update the current second preview image $IMG_t$. As shown in FIG. 8, the 3D quality requirement is not satisfied until the electronic device 100 is moved to a fourth position at time $T_4$. Hence, the 3D image derived from the fixed first preview image $IMG_1$ and the second preview image $IMG_t$ generated at time $T_4$ is automatically selected and outputted as a captured 3D image.

In above embodiments, the first preview image $IMG_1$ is fixed while the electronic device 100 is moving under the 3D preview mode. However, in an alternative design, the first preview image and the second preview image which form a captured 3D image are both generated while the electronic device 100 is moving under the 3D preview mode. Specifically, each of the first preview image and the second preview image is continuously updated while the electronic device 100 is moving. The same objective of allowing the user to perceive the 3D preview during the 3D image capture procedure is achieved. This alternative design also falls within the scope of the present invention.

Figure 9:
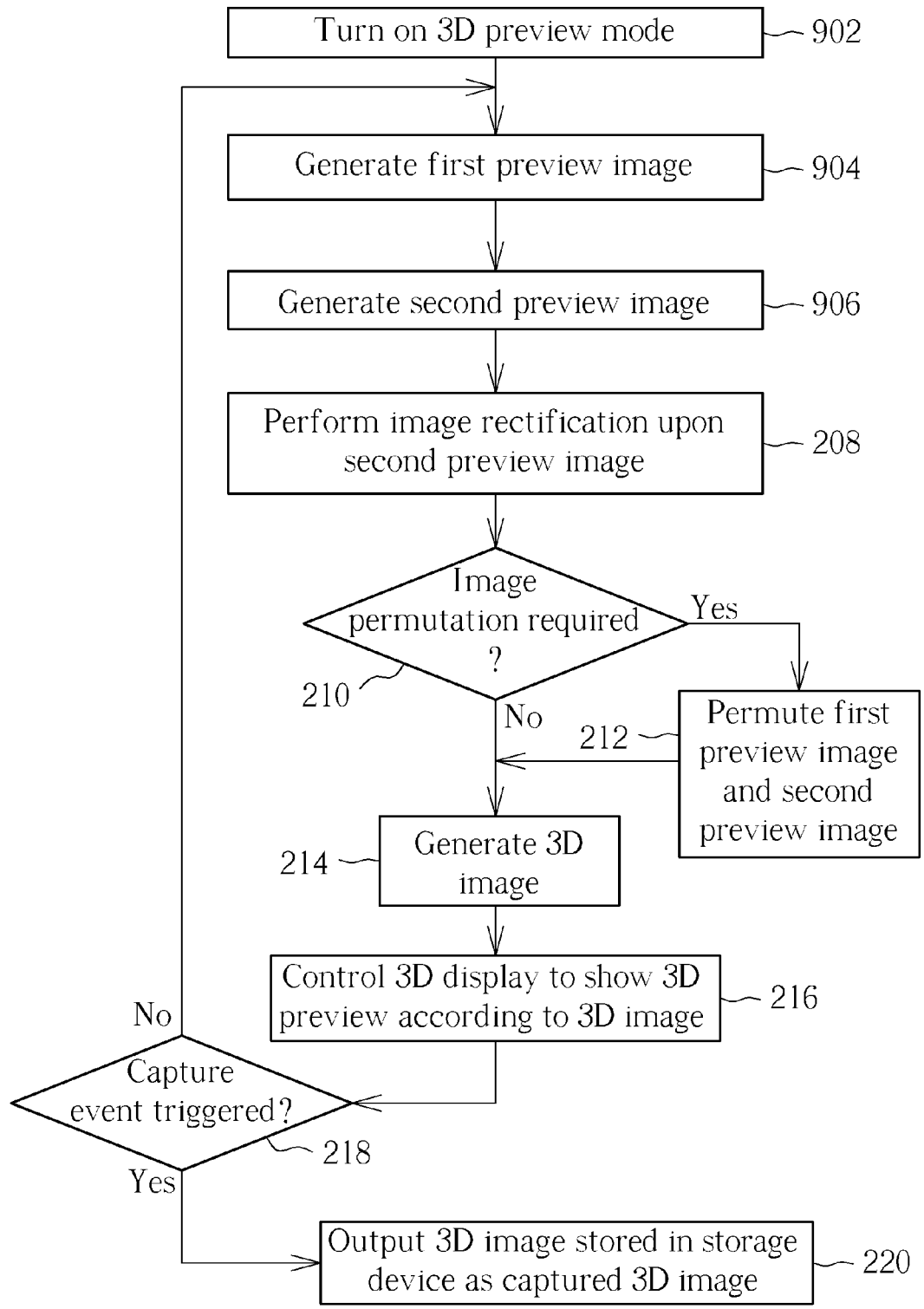
FIG. 9 is a flowchart illustrating a third 3D image capture method according to an embodiment of the present invention.

Please refer to FIG. 9, which is a flowchart illustrating a third 3D image capture method according to an embodiment of the present invention. When the election device 100 is still, the user touches the 3D display 104 with touch control capability to enter a user input. In step 902, the controller 106 turns on a 3D preview mode. The GUI 109 instructs the user to start moving the election device 100. While the election device 100 is moving, the monocular camera 102 automatically generates one first preview image $IMG_{t1}$ and one second preview image $IMG_{t2}$ at different time points (steps 904, 906). In this embodiment, the first preview image $IMG_{t1}$ is generated before the second preview image $IMG_{t2}$. The first preview image $IMG_{t1}$, which will be continuously updated under the 3D preview mode, replaces the fixed first preview image $IMG_1$ mentioned above. Regarding the second preview image $IMG_{t2}$, it is similar to the second preview image $IMG_t$ mentioned above since both will be continuously updated under the 3D preview mode. The following steps in FIG. 9 are identical that shown in FIG. 2. Hence, when the capture event is not triggered, the flow proceeds with step 904. Besides, while the election device 100 is moving, the monocular camera 102 updates the first preview image $IMG_{t1}$ and the second preview image $IMG_{t2}$ at different time points (steps 904, 906). The 3D image capture procedure does not stop updating the first preview image $IMG_{t1}$ and the second preview image $IMG_{t2}$ until the capture event is triggered. When the capture event is triggered, a 3D image stored in the storage device 107 is selected and outputted as a captured 3D image.

Figure 10:
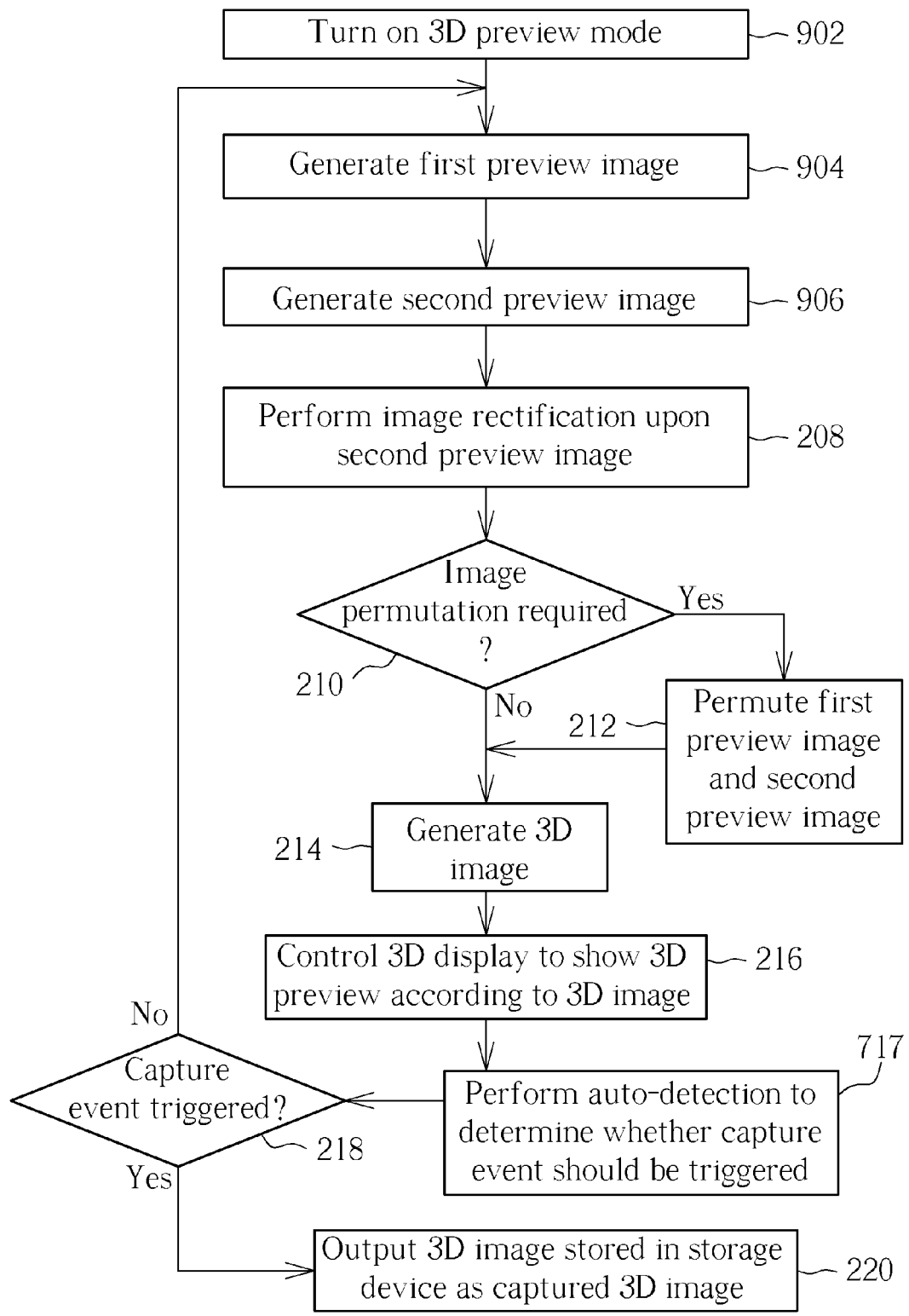
FIG. 10 is a flowchart illustrating a fourth 3D image capture method according to an embodiment of the present invention.

Please refer to FIG. 10, which is a flowchart illustrating a fourth 3D image capture method according to an embodiment of the present invention. The major difference between the 3D image capture methods shown in FIG. 9 and FIG. 10 is the step 717 inserted between steps 216 and 218. Step 717 is arranged to perform an auto-detection procedure to determine whether the capture event should be triggered. As a person skilled in the art can readily understand details of the steps shown in FIG. 10 after reading above paragraphs, further description is omitted here for brevity.

In summary, the present invention provides a friendly GUI which shows 3D preview when an electronic device with a monocular camera is operated under a preview mode, thus allowing the user to easily shoot good 3D images. The proposed electronic device (e.g., a cellular phone or a tablet) is able to provide a real-time 3D image preview and an immediate 3D image playback, thus enhancing the user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A three-dimensional (3D) image capture method employed in an electronic device with a monocular camera and a 3D display, comprising:
   before a capture event is triggered, turning on a 3D preview mode of the electronic device;
   while the electronic device is moving under the 3D preview mode, deriving a 3D preview image from a first preview image and a second preview image generated by the monocular camera, and providing 3D preview on the 3D display according to the 3D preview image, wherein at least one of the first preview image and the second preview image is generated while the electronic device is moving under the 3D preview mode; the 3D preview image is a pair of a left-view preview image and a right-view preview image, the 3D preview of the 3D preview image is provided under the 3D preview mode by controlling the 3D display according to the left-view preview image and the right-view preview image, the left-view preview image is generated from one of the first preview image and the second preview image, the right-view preview image is generated from another of the first preview image and the second preview image, the first preview image is generated by the monocular camera when the electronic device is at a first position, and the second preview image is generated by the monocular camera when the electronic device is at a second position different from the first position; and
   when the capture event is triggered, outputting the 3D preview image as a 3D captured image;
   wherein each of the first preview image and the second preview image is continuously updated by the monocular camera while the electronic device is moving, the electronic device further includes a motion sensor, and motion information provided by the motion sensor is referenced by an image permutation.

2. The 3D image capture method of claim 1, wherein the first preview image and the second preview image are both generated while the electronic device is moving.

3. The 3D image capture method of claim 1, wherein while the electronic device is moving, the at least one of the first preview image and the second preview image is automatically generated by the monocular camera without user intervention.

4. The 3D image capture method of claim 1, wherein the step of deriving the 3D preview image from the first preview image and the second preview image comprises:
   performing an image rectification upon the second preview image to make the 3D preview image satisfy a stereoscopic vision requirement; and
   generating the 3D preview image according to the first preview image originally generated by the monocular camera and the second preview image adjusted by the image rectification.

5. The 3D image capture method of claim 4, wherein motion information provided by the motion sensor is referenced by the image rectification.

6. The 3D image capture method of claim 1, wherein the step of deriving the 3D preview image from the first preview image and the second preview image comprises:
   performing the image permutation upon the first preview image and the second preview image to generate the 3D preview image.

7. An electronic device with a three-dimensional (3D) image capture function, comprising:
   a monocular camera;
   a motion sensor;
   a 3D display; and
   a controller, coupled to the monocular camera and the 3D display, wherein the controller turns on a 3D preview mode of the electronic device before a capture event is triggered; while the electronic device is moving under the 3D preview mode, the controller derives a 3D preview image from a first preview image and a second preview image generated by the monocular camera, and controls the 3D display to provide 3D preview according to the 3D preview image, wherein at least one of the first preview image and the second preview image is generated while the electronic device is moving under the 3D preview mode; the 3D preview image comprises a left-view preview image and a right-view preview image, the controller controls the 3D display to provide the 3D preview of the 3D preview image under the 3D preview mode according to the left-view preview image and the right-view preview image, the left-view preview image is generated from one of the first preview image and the second preview image, the right-view preview image is generated from another of the first preview image and the second preview image, the first preview image is generated by the monocular camera when the electronic device is at a first position, and the second preview image is generated by the monocular camera when the electronic device is at a second position different from the first position; and when the capture event is triggered, the controller outputs the 3D preview image as a 3D captured image; wherein each of the first preview image and the second preview image is continuously updated by the monocular camera while the electronic device is moving, and motion information provided by the motion sensor is referenced by an image permutation performed by the controller.

8. The electronic device of claim 7, wherein the first preview image and the second preview image are both generated while the electronic device is moving.

9. The electronic device of claim 7, wherein while the electronic device is moving, the at least one of the first preview image and the second preview image is automatically generated by the monocular camera without user intervention.

10. The electronic device of claim 7, wherein the controller further performs an image rectification upon the second preview image to make the 3D preview image satisfy a stereoscopic vision requirement, where the 3D preview image is generated according to the first preview image originally generated by the monocular camera and the second preview image adjusted by the image rectification.

11. The electronic device of claim 10, wherein motion information provided by the motion sensor is referenced by the image rectification performed by the controller.

12. The electronic device of claim 7, wherein the controller performs the image permutation upon the first preview image and the second preview image to generate the 3D preview image.

13. The 3D image capture method of claim 1, wherein deriving the 3D preview image from the first preview image and the second preview image generated by the monocular camera comprises:
  after the first preview image is generated by the monocular camera, generating the second preview image by the monocular camera while the electronic device keeps moving from the first position to the second position under the 3D preview mode;
  after the 3D preview is provided on the 3D display under the 3D preview mode, checking if the capture event is triggered; and
  when the capture event is not triggered yet, generating a new preview image by the monocular camera while the electronic device keeps moving from the second position to a third position under the 3D preview mode, and updating the 3D preview image by replacing one of the first preview image and the second preview image with the new preview image, wherein the new preview image is generated by the monocular camera when the electronic device is at the third position that is different from each of the first position and the second position.

14. The electronic device of claim 7, wherein after the first preview image is generated by the monocular camera, the second preview image is generated by the monocular camera while the electronic device keeps moving from the first position to the second position under the 3D preview mode; when the capture event is not triggered after the 3D preview is provided on the 3D display under the 3D preview mode, a new preview image is generated by the monocular camera while the electronic device keeps moving from the second position to a third position under the 3D preview mode, and the 3D preview image is updated by replacing one of the first preview image and the second preview image with the new preview image, where the new preview image is generated by the monocular camera when the electronic device is at the third position that is different from each of the first position and the second position.

\* \* \* \* \*